United States Patent [19]

Hayase

[11] Patent Number: 4,958,110
[45] Date of Patent: Sep. 18, 1990

[54] TELEVISION RECEIVER
[75] Inventor: Akihiko Hayase, Takatsuki, Japan
[73] Assignee: Matsushita Electric Industrial Co., Ltd., Osaka, Japan
[21] Appl. No.: 470,133
[22] Filed: Jan. 25, 1990
[30] Foreign Application Priority Data Jan. 31, 1989 [JP] Japan .................................. 1-21419

[51] Int. Cl.$^5$ ......................... H01J 29/70; H01J 29/76
[52] U.S. Cl. .................................. 315/408; 315/411; 358/190
[58] Field of Search .................. 315/408, 411; 363/21; 358/190

[56] References Cited

U.S. PATENT DOCUMENTS 4,823,052  4/1989  Onozawa et al. .................. 315/408

OTHER PUBLICATIONS

"Color TV Text, 6.4.4 Drive Circuit and Output Circuit", Nippon Hoso Kyokai, pp. 176 to 182; 1st ed. 1977, 24th ed, 1987-English Translation.

Primary Examiner—Theodore M. Blum
Attorney, Agent, or Firm—Stevens, Davis, Miller & Mosher

[57] ABSTRACT

A television receiver in which a high voltage detection circuit detects the FBT output voltage which is supplied to the cathode ray tube, a comparison circuit compares the detected voltage with a reference voltage, and the supply voltage to the FBT is controlled by a control signal which represents the result of comparison. The control signal provided by the comparison circuit is also used to control the supply voltage to a drive circuit which injects base carriers to a high voltage generating transistor, so that a proper drive control takes place automatically depending on the load condition of the high voltage.

1 Claim, 2 Drawing Sheets

TELEVISION RECEIVER

BACKGROUND OF THE INVENTION

This invention relates to a television receiver incorporating a horizontal output deflection circuit which implements the proper drive control for the output transistor automatically depending on the high-voltage output capacity.

The horizontal deflection circuit in a television receiver operates to swing the electron beam and left in the cathode ray tube in response to a sawtooth wave current of about 15,750 Hz supplied to the horizontal deflection coil. The horizontal deflection circuit basically comprises a horizontal oscillation circuit, a horizontal drive circuit and a horizontal output circuit, as shown in FIG. 1. In addition, the horizontal deflection circuit includes a synchronous AFC circuit, high-voltage generation circuit, power supply circuit, etc.

Generally, in order to operate stably the output transistor which forms the horizontal output circuit, a base current greater in value than the collector current, which fits the high-voltage capacity, divided by the d.c. current gain of the transistor is fed to the base. Namely, the output transistor is operated in over-drive mode. On this account, conventional television receivers are provided with a heat sink having a cooling ability to meet the high-voltage capacity and characteristics of the transistor.

The above-mentioned horizontal drive and horizontal output circuits are arranged as shown in FIG. 2. In the figure, indicated by $Tr_1$ is a transistor which forms the horizontal oscillating circuit, $Tr_2$ is a transistor which forms the horizontal drive circuit, and $Tr_3$ is a transistor which forms the horizontal output circuit.

In order to bring the output transistor $Tr_3$ quickly into a state of saturation (ON) or a state of cutoff (OFF), a sufficient base current must be fed. Therefore, an amplifying circuit is configured between the oscillation circuit and output circuit so that the pulse voltage is rendered the amplification and waveform shaping before it is delivered to the output circuit. This amplifying circuit is called "drive circuit", and it is generally an emitter-grounded transformer-coupled amplifying circuit as shown in FIG. 2. The driving transistor $Tr_2$ operates as a switching element as in the output circuit, and it is OFF when the output circuit is ON, or it is ON when the output circuit is OFF, so that the driving transformer is always loaded by one of the transistors $Tr_2$, $Tr_3$.

However, the conventional arrangement is designed to operate the output transistor stably by feeding a base current greater in value than the collector current, which fits the maximum high-voltage output capacity, divided by the minimum d.c. current gain of the transistor $Tr_3$ by means of the driving transistor $Tr_2$, and therefore in an operating condition of a minimal high-voltage output capacity and a maximal transistor d.c. current gain in combination, an excessive base current creates an increased collector loss and a temperature rise at the semiconductor junction section, which necessitates a large heat sink having a small thermal resistance in order to operate the transistor stably and safely, resulting in an increased cost and awkward packaging.

SUMMARY OF THE INVENTION

An object of this invention is to overcome the foregoing prior art problem and to provide a television receiver in which the high-voltage output capacity is detected automatically and a base current which suits the high-voltage output capacity is fed to the high-voltage output transistor so that the collector loss of the transistor is kept optimal and constant, thereby making the transistor cooling heat sink compact and inexpensive.

In order to achieve the above objective, the inventive television receiver is characterized in comprising a flyback transformer (FBT) which supplies a high voltage to the cathode ray tube, a circuit which detects a high voltage produced by the FBT, a comparison circuit which compares the voltage signal representing the voltage detected by the high voltage detection circuit with a reference voltage, a voltage control circuit which controls the supply voltage to the FBT in accordance with the control signal provided by the comparison circuit, an output circuit which includes a transistor for operating the FBT to generate the high voltage, a drive circuit which drives the transistor, and a voltage control circuit which controls the supply voltage to the drive circuit in accordance with the control signal provided by the comparison circuit.

By the above-mentioned inventive arrangement, a voltage produced by the FBT which supplies a high voltage to the cathode ray tube is detected by the detection circuit, the detected signal is compared with the reference voltage by the comparison circuit, the supply voltage to the FBT is controlled in accordance with the control signal which is based on the comparison result, and the supply voltage to the drive circuit, which injects base carriers to the high-voltage generating transistor, is controlled in accordance with the control signal provided by the comparison circuit, so that the high-voltage output transistor is driven properly depending on the load of the high voltage automatically.

DESCRIPTION OF THE PREFERRED EMBODIMENT

Figure 1:
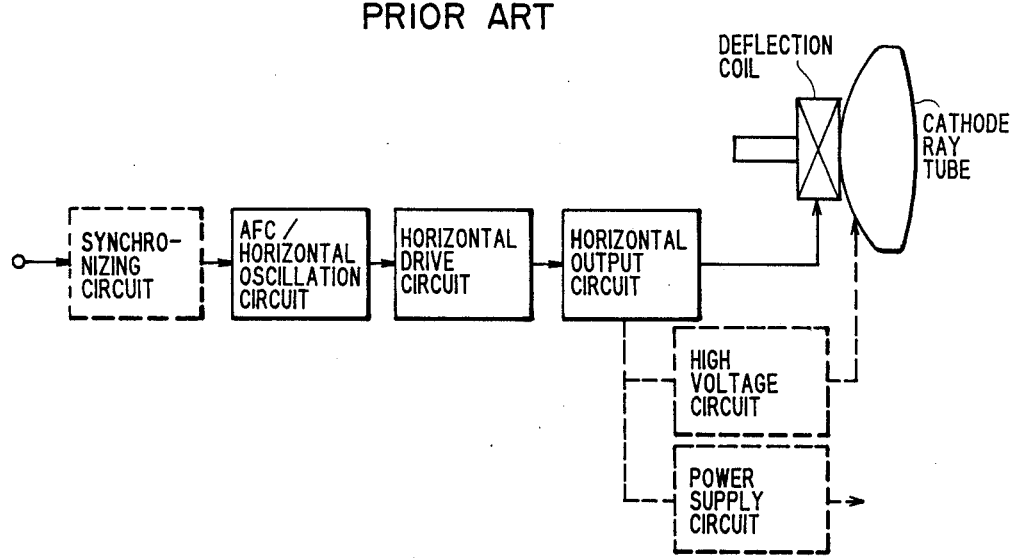
FIG. 1 is a block diagram of the horizontal deflection circuit used in the conventional television receiver.
Figure 2:
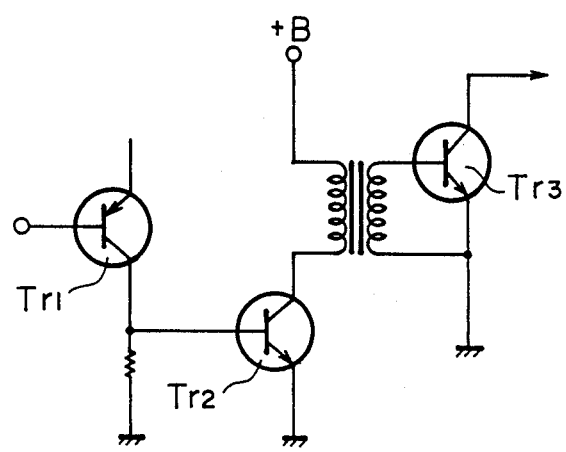
FIG. 2 is a schematic diagram showing the conventional horizontal drive and horizontal output circuits.
Figure 3:
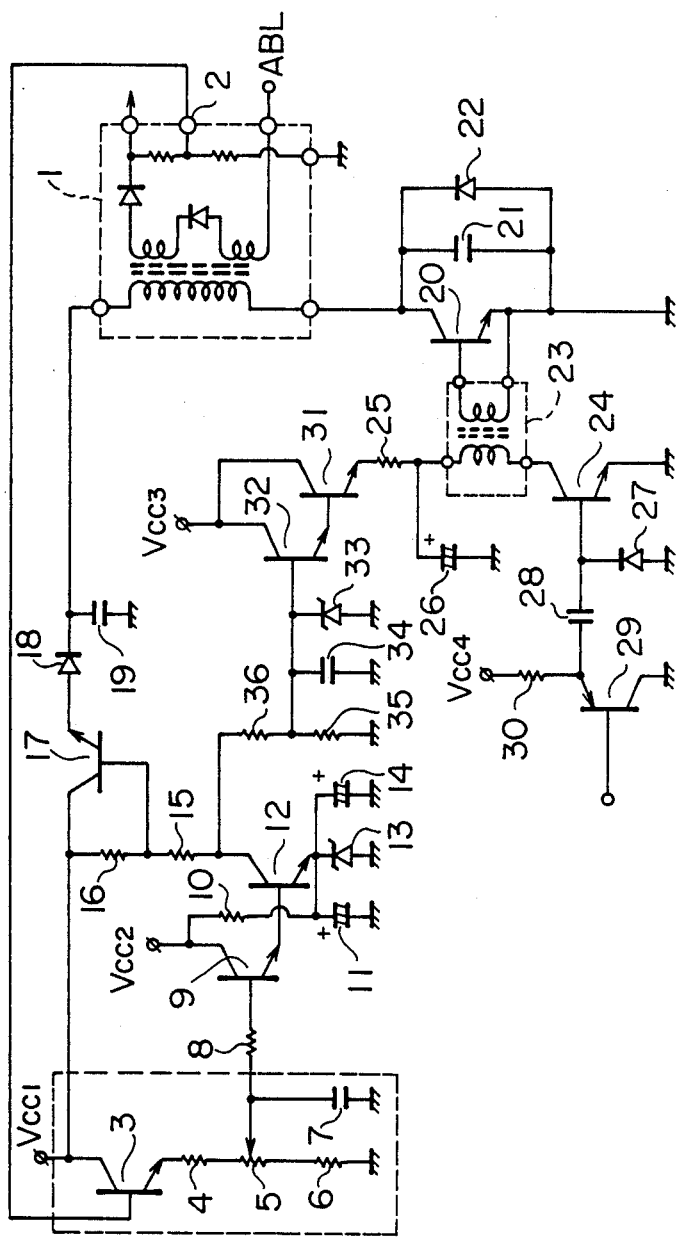
FIG. 3 is a schematic diagram of the television receiver according to an embodiment of this invention.

FIG. 3 is a schematic diagram showing the arrangement of the television receiver embodying the present invention. In the figure, indicated by 1 is a fly-back transformer (FBT) and 2 is a high-voltage detection terminal to which the high voltage output of the FBT 1 divided by resistors is led out. Connected to the high voltage detection terminal 2 is a high-voltage detection circuit which is made up of a transistor 3, resistors 4, 5 and 6, and a capacitor 7. The high voltage detection circuit produces a high voltage detected signal on the central terminal of resistor 5, the high voltage detected signal is applied to a comparison circuit formed of resistors 8 and 10, transistors 9 and 12, capacitors 11 and 14, and zener diode 13. The signal applied to the base of the transistor 9 is compared with a reference voltage produced by the zener diode 13, and a comparison output controls the collector current of the transistor 12. The collector current flowing through the load resistors 15 and 16 of the transistor 12 produces a voltage drop (the voltage $V_{16}$) across the resistor 16. The voltage $V_{16}$ is applied to the base of the transistor 17, which produces an output voltage on its emitter and it is smoothed by a diode 18 and capacitor 19 and fed to the FBT.

When the output voltage of the FBT 1 falls, the voltage signal on the high voltage detection terminal 2 falls, and the high voltage detected signal on the central terminal of resistor 5 of the high-voltage detection circuit also falls. As a result of the fall of the detected signal which is applied to the base of the transistor 9 in the comparison circuit, the difference of the voltage from the reference voltage which is determined by the zener diode 13 reduces, and accordingly the transistor 12 has its base-emitter voltage falling, resulting in a decreased collector current of the transistor 12. A decrease of the collector current produces a smaller voltage drop across the resistor 16, causing the base voltage of the transistor 17 to rise. Then, the emitter voltage of the transistor 17 rises and the supply voltage to the FBT 1 also rises, and consequently the high voltage output also rises. Through the foregoing control operation, the high voltage output is maintained constant.

A resonance circuit is formed of a transistor 20, a capacitor 21 and a diode 22, and resonant pulses are supplied to the FBT 1 for the generation of high voltage. A drive transformer 23 is used to drive the transistor 20, with the supply current to the drive transformer 23 being produced by the switching operation of a transistor 24. A diode 27, capacitor 28, resistor 30 and transistor 29 constitute in unison a drive pulse supply circuit which operates the drive transistor 24.

The collector voltage of the transistor 12 in the comparison circuit is divided using resistors 35 and 36, and the divided voltage is supplied to the drive circuit voltage supply circuit formed of transistors 31 and 32, resistor 25 and capacitor 26. A capacitor 34 is for noise suppression, and a zener diode 33 is for input protection. In response to the voltage signal applied to the base of the transistor 32, the emitter of the transistor 31 delivers the supply voltage to the drive circuit.

In operation, when the output voltage of the FBT 1 rises, the collector current of the transistor 20 increases. At the same time, a voltage fall resulting from the rising output of the FBT 1 causes the comparison circuit to have a rise in its collector voltage. Then, the voltage at the node of the resistors 35 and 36 also rises, and the supply voltage to the drive circuit rises. The rising supply voltage increases the current on the primary winding of the drive transformer 23, and the transistor 20, whose collector current has increased as mentioned above, has its base current increasing. Inversely, when the output of the FBT 1 falls, the collector current of the transistor 20 decreases and, at the same time, the base current also decreases. Accordingly, the drive condition, i.e., the collector loss, of the transistor 20 is maintained constant regardless of the output variation of the FBT 1, whereby the television receiver using an optimal, compact and inexpensive heat sink can be accomplished.

I claim:

1. A television receiver comprising: a fly-back transformer for supplying a high voltage to a cathode ray tube; a circuit for detecting a high voltage produced by said fly-back transformer; a comparison circuit for comparing the voltage detected by said high voltage detection circuit with a reference voltage; a voltage control circuit for controlling the magnitude of a voltage supplied to said fly-back transformer in accordance with a control signal produced by said comparison circuit; an output circuit including an output transistor for driving said fly-back transformer to generate the high voltage; a drive circuit for driving said output circuit; and a voltage control circuit for controlling a supply voltage to said drive circuit in accordance with the control signal produced by said comparison circuit.

* * * * *